(12) United States Patent
Evans

(10) Patent No.: US 7,614,828 B1
(45) Date of Patent: Nov. 10, 2009

(54) CONDUIT RETAINER APPARATUS

(76) Inventor: Daniel D. Evans, 3001 E. Cholla, Phoenix, AZ (US) 85028

( * ) Notice: Subject to any disclaimer, the term of this patent is extended or adjusted under 35 U.S.C. 154(b) by 223 days.

(21) Appl. No.: 11/390,919

(22) Filed: Mar. 27, 2006

(51) Int. Cl.
F16L 3/00 (2006.01)

(52) U.S. Cl. .................. 405/184.4; 405/154.1; 405/15; 248/65; 248/57; 403/2

(58) Field of Classification Search ............. 405/184.4, 405/172, 282, 283, 154.1, 157; 248/505, 248/506, 65, 56, 57; 403/2
See application file for complete search history.

(56) References Cited

U.S. PATENT DOCUMENTS 3,530,679 A * 9/1970 Krings ....................... 405/282

2002/0021004 A1* 2/2002 Mitchell ....................... 285/15
2003/0198520 A1* 10/2003 Evans ....................... 405/184.4
2005/0232701 A1* 10/2005 Humphries et al. ........... 405/43

* cited by examiner

Primary Examiner—David J Bagnell
Assistant Examiner—Sean D Andrish
(74) Attorney, Agent, or Firm—The Noblitt Group, PLLC

(57) ABSTRACT

A nonconductive bridge element is secured to a pair of end plates in a conduit retainer apparatus in a trench. The pair of end plates are secured to a trench wall by dowels extending through holes in the end plates and the bridge element is disposed in the trench on top of conduits. The end plates are two piece elements, a plate and an insert pin extending through the plate. The center bridge element comprises a nonconductive tube, the ends of which receive the insert pins.

12 Claims, 1 Drawing Sheet

CONDUIT RETAINER APPARATUS

BACKGROUND OF THE INVENTION

1. Field of the Invention

This invention relates to apparatus for holding conduits in a trench and, more particularly to apparatus disposed on top of conduits in a trench and extending between the sides of the trench for retaining the conduits in the trench while the trench is back filled with concrete.

2. Description of the Prior Art

In construction, trenches are dug to receive conduits. The conduits are used for different things, such as electrical conductors, fiber optics, data communications, etc. Typically, there may be several conduits or as few as one conduit in a single trench. After the conduits are disposed in a trench, the trench is sometimes back filled with concrete. The conduits have a tendency to rise in the concrete as the concrete is being poured, and in order to prevent the conduits from rising, the conduits must be held in place in some manner.

Typically, the conduits are individually fastened in place in some manner in a relatively time consuming and expensive manner.

The apparatus overcomes the deficiencies in the prior art by providing a retainer disposed on top of the conduits and extending between the sides of the trench. The conduit retainers may be placed on the conduits in a spaced apart manner in the trench quickly and easily and the conduit retainers are relatively inexpensive to manufacture.

SUMMARY OF THE INVENTION

The invention described and claimed herein comprises conduit retainer apparatus comprised of a nonconductive center bridge element disposed between a pair of two piece end plates. The end plates are secured to the walls of a trench and the center bridge element is disposed on conduits in the trench to prevent the conduits from rising while being encased in concrete. The two piece end plates include an insert pin which may be reduced in size to allow pvc pipes of different sizes to be used as a bridge element. The end plates also include apertures for receiving dowel elements which extend into the walls of the trench to prevent the bridge from coming loose while concrete is being poured into the trench and around the conduits being retained. Typically, thin walled tubing may be used as the holding dowels to hold the end plates to the trench walls. The retainer apparatus is placed on top of conduits which are typically disposed on chairs in the trench, and the apparatus remains in place in the trench.

Among the objects of the present invention are the following:

To provide new and useful conduit retainer apparatus;

To provide new and useful apparatus for retaining conduits in trenches;

To provide new and useful conduit retainer apparatus including a central bridge element and a pair of end plates;

To provide new and useful conduit retainer apparatus having three elements, a center bridge element disposed between two end plates;

To provide new and useful conduit retainer apparatus including a pair of end plates having apertures for receiving dowels to hold the end plates to trench walls;

To provide new and useful apparatus for holding conduits in a trench, with the apparatus including a central bridge portion and a pair of end plates having apertures for receiving dowel elements to secure the end plates to trench walls;

To provide new and useful apparatus having nonconductive elements easily assembled and made of relatively inexpensive material; and To provide a new and useful two piece end plate for a conduit retainer

BRIEF DESCRIPTION OF THE DRAWING

FIG. 1 is a perspective view of a trench having two walls 2 and 4 and a trench bottom 6, with three conduits 8 disposed on the trench bottom 6. A conduit retainer apparatus 10 disposed in the trench between walls 2 and 4 and on the three conduits 8. The conduit apparatus 10 includes an end plate 12 and insert pin 40 combination. Two end plate and insert elements support a center bridge element 70 which in turn is disposed over a conduit or conduits in a trench.

FIG. 2 is a side view of the insert pin 40, and FIG. 3 is a front view of the end plate 12. FIG. 4 is a side view of the apparatus 10 in its use environment. For the following discussion, reference may be made to all of the FIGS. 1, 2, 3, and 4.

Figure 1:
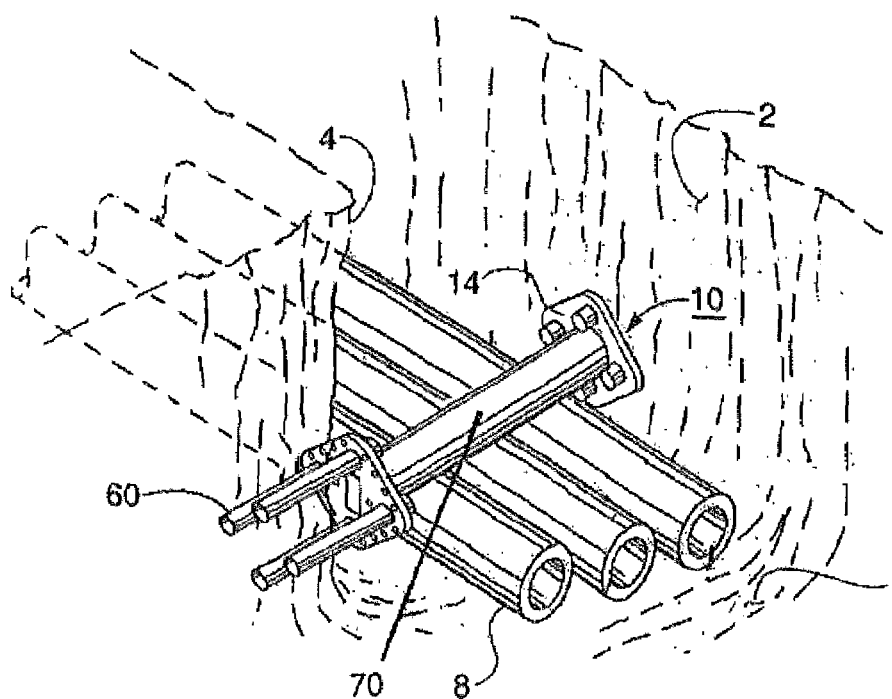
FIG. 1 is a perspective view of the apparatus of the present invention in its use environment.
Figures 2, 3:
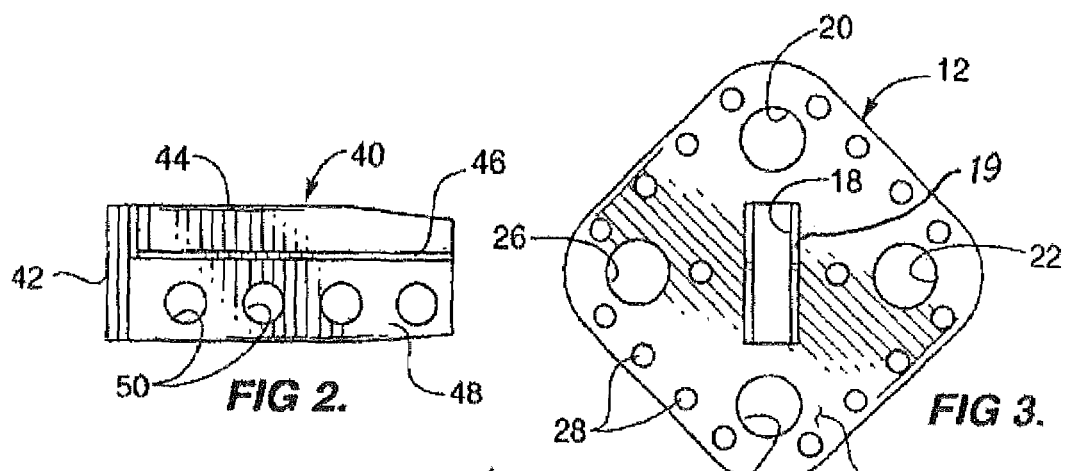
FIG. 2 is a side view of part of the apparatus of the present invention.
FIG. 3 is an end view of part of the apparatus of the present invention.

The conduit retainer apparatus 10 includes the end plate 12 and the insert pin 40. The end plate includes a center rectangular aperture 18 for receiving the insert pin. Typically, nonconductive pvc pipe is used for the bridge element between two end plates. The insert pins 40 hold the bridge element in place. For convenience in using either one inch or one and one half inch pvc pipe as bridge elements, the insert pin includes a removable portion to accommodate either size pipe.

Figure 4:
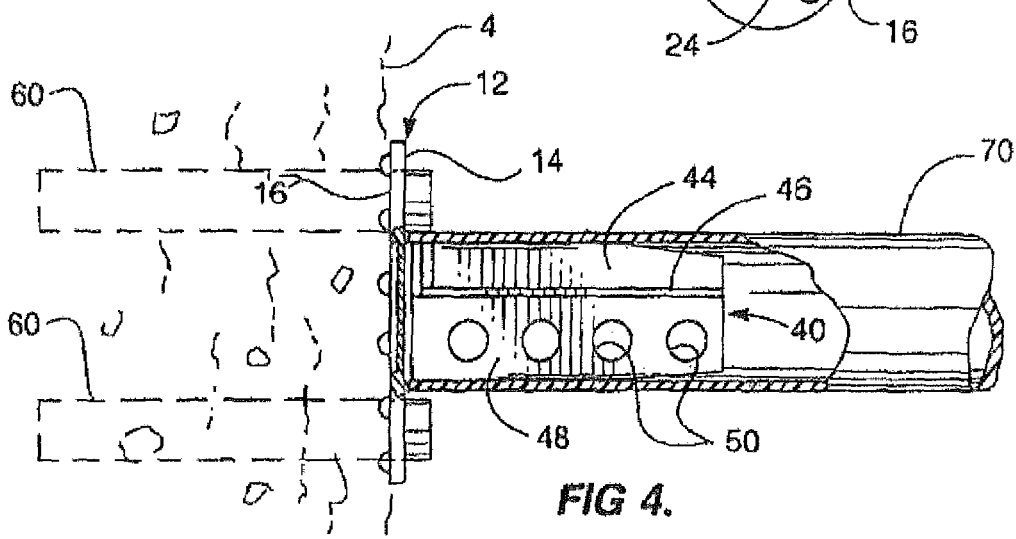
FIG. 4 is a side view in partial section of the apparatus of the present invention in its use environment.

The insert pin 40 includes a relatively small rectangular back plate 42. Extending outwardly from the back plate 42 are two extension elements 44 and 48. Between the extension elements 44 and 48 is a relatively thin web 46. The web 46 allows the top extension element 44 to be broken off. Without the extension 44, the extension 48 received a one inch pvc pipe bridge element 70. With both extensions 44 and 48, the insert pin receives a one and one half inch pvc pipe bridge element 70. This is best shown in FIG. 4.

The bottom extension 48 includes a plurality of holes 50. The holes serve no purpose other than to decrease the amount of material in the element.

The plate 12 includes a front side 14 and a back side 16. The plate 12 is generally square, with a central rectangular aperture 18. The aperture 18 receives the insert pin 40. The insert 40 is secured to the plate 12 from the rear side 16.

About the aperture 18 is a recessed portion 19 which receives, or into which extends, the relatively small back plate 42 of the insert pin 40.

The plate 12 also includes four apertures 20, 22, 24, and 26. The apertures 20, 22, 24, 26 are dimensioned to receive relatively long dowels for holding the plate 12 in place on a trench wall. The plate 12 and the insert pin 40 and the bridge 70 are made of nonconductive material so as to substantially eliminate any adverse electrical problems which occur when metallic, or conductive, elements are used as conduit retainers.

Typically, thin walled conduit is used as dowel material. For example, in loose soil, four dowels 60 are inserted through the holes 20 . . . 26 to hold the retainer apparatus 10 to the trench wall 4, as shown in FIG. 4. Electricians will usually have such thin walled conduit, and cutting the conduit into appropriate lengths for use as dowels is not difficult. The use of the thin walled conduit for the dowel elements does not cause electrical problems that conductive materials in a bridge cause.

As indicated above, nonconductive pvc pipe or conduit is used for the bridge element so as to eliminate the possibility of electrical problems.

On the back or rear side 16 of the plate 12 are bumps 28. The purpose of the bumps 28 is to help increase the friction or holding power of the plates 12 on a trench wall. The bumps 28 are relatively small protuberances which extend outwardly from the back 16 of the plate 12. When a plate 12 is placed on a trench wall, the bumps 28 help to hold the plate in place while the dowels are inserted through the dowel apertures 20 ... 26.

The end plates and the insert pins are made in two pieces for convenience in shipping and storing. The two elements may be packaged and transported as flat elements. Moreover, the molds for the two elements are less expensive than a mold for the finished product.

The present invention is particularly adapted for use in loose, sandy soil. The thin walled conduit used for dowels is easy to insert into such soil and is readily available and relatively inexpensive.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. A retainer apparatus for holding down conduits in a trench having a bottom and a pair of walls, comprising:
    a nonconductive center bridge element configured to be disposed on top of the conduits in the trench; and
    a pair of end plates configured to be secured to the center bridge element and disposed against the walls of the trench, wherein each end plate comprises:
        a plate,
        a plurality of dowels extending through the plate and into the walls of the trench; and
        an insert pin extending outwardly from the plate for receiving the center bridge element to the end plate, wherein the insert pin includes a first extension element and a second extension element, wherein:
            the second extension element is removable from the first extension element;
            the first and second extension elements are separated by a web; and
            the first and second extension elements are configured to receive center bridge elements of varying diameters.

2. The apparatus of claim 1, wherein each of the end plates includes; a plurality of apertures for receiving the dowels.

3. The apparatus of claim 1, wherein the two bridge elements have respectively a large diameter and a small diameter, and the insert pin comprising the first and second extension elements extends into a large diameter bridge element.

4. The apparatus of claim 1, wherein the first extension element is configured to receive a bridge element having a small diameter when the second extension element is removed.

5. The apparatus of claim 1, wherein the insert pin is removable from the plate for shipping and is insertable into the plate for use in a trench.

6. The apparatus of claim 1, wherein the insert pin includes a back plate secured to the first and second extension elements.

7. The apparatus of claim 6, wherein each of the end plates has; an aperture for receiving the insert pin.

8. The apparatus of claim 7, wherein each of the end plates includes; a recess about the aperture, and the back plate extends into the recess and the two extension elements extend through the aperture.

9. The apparatus of claim 1, wherein each of the end plates includes; a front side and a back side, and the back side includes a plurality of rumps.

10. An apparatus for retaining at least a single conduit in a trench having a pair of side walls and a bottom wall comprising:
    an end plate, including
    a first aperture for receiving an insert pin,
    a second aperture for receiving a dowel for securing the end plate to a wall of the trench; and
    an insert pin extending through the first aperture for receiving a bridge element disposed on the conduit for retaining the conduit in the trench, wherein the insert pin includes a first extension element and a second extension element, wherein:
        the second extension element is removable from the first extension element;
        the first and second extension elements are separated by a web; and
        the first and second extension element are configured to receive the bridge element having a first diameter when the first and second extension element are secured to the end plate and the bridge element having a second diameter when the removable second extension element is removed from the first extension element.

11. The apparatus of claim 10, wherein the end plate includes a plurality of second apertures for receiving a plurality of dowels for securing the end plate to at least one of the side walls of the trench.

12. The apparatus of claim 10, wherein the bridge element is nonconductive tubing.

* * * * *

UNITED STATES PATENT AND TRADEMARK OFFICE
CERTIFICATE OF CORRECTION

PATENT NO.         : 7,614,828 B1
APPLICATION NO.    : 11/390919
DATED              : November 10, 2009
INVENTOR(S)        : Daniel D. Evans It is certified that error appears in the above-identified patent and that said Letters Patent is hereby corrected as shown below:

In column 4, claim 9, line 26, delete "rumps" and insert --bumps--;

In column 4, claim 10, line 46, delete "element" and insert --elements--.

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

PATENT NO.       : 7,614,828 B1                               Page 1 of 1
APPLICATION NO.  : 11/390919
DATED            : November 10, 2009
INVENTOR(S)      : Daniel D. Evans It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 451 days.

Signed and Sealed this

Nineteenth Day of October, 2010

David J. Kappos
*Director of the United States Patent and Trademark Office*